May 9, 1961   L. O. PERSINGER ET AL   2,983,218
BARBECUE GRILL ATTACHMENT
Filed Nov. 26, 1958
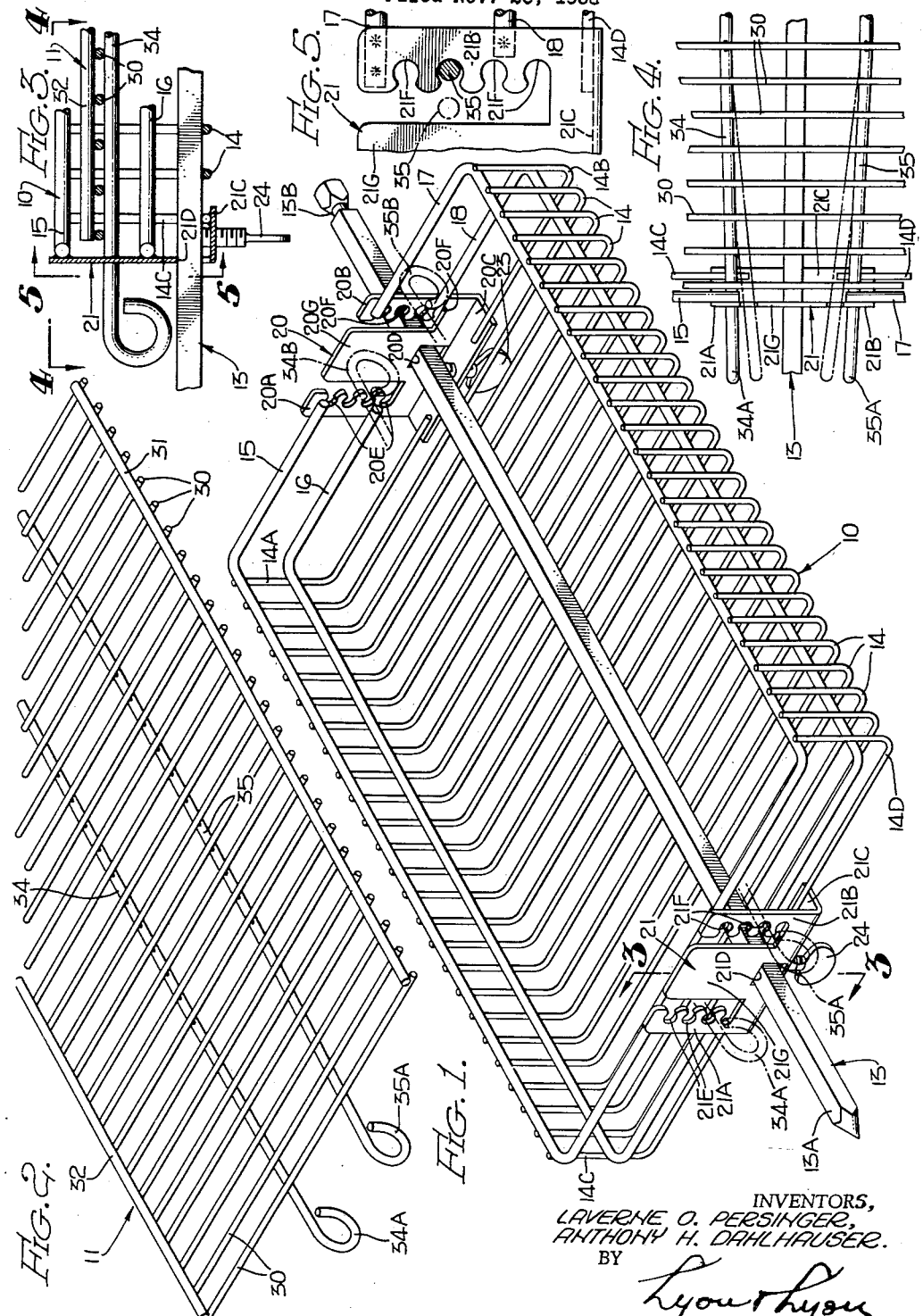
INVENTORS,
LAVERNE O. PERSINGER,
ANTHONY H. DAHLHAUSER.
BY
ATTORNEYS

United States Patent Office 2,983,218
Patented May 9, 1961

2,983,218

BARBECUE GRILL ATTACHMENT

Laverne O. Persinger, Burbank, and Anthony H. Dahlhauser, Saratoga, Calif., assignors to Big Boy Manufacturing Company, a division of Seidelhuber Steel Rolling Mills Corporation, Burbank, Calif., a corporation of Washington Filed Nov. 26, 1958, Ser. No. 776,582

4 Claims. (Cl. 99—427)

The present invention relates to barbecue equipment and has particular reference to a device for supporting food products during barbecue grilling operations, and in general relates to improvements in the type of barbecue basket or spit basket shown and described in U.S. Patent No. 2,839,989 granted June 24, 1958.

An object of the present invention is to provide an improved barbecue basket construction capable of supporting articles of food of the various shapes, sizes and textures suitable for barbecue grilling in such a manner that uniformly perfect grilling may be assured.

Another object of the present invention is to provide a barbecue spit basket of the character described which may be mounted on the type of spit ordinarily employed.

Another object of the present invention is to provide an improved barbecue support constructed, shaped and so operable that melting fat is mostly discharged outside the center of the fire area of the stand thereby to minimize odor-filled splashings.

A specific object of the present invention is to provide an improved spit-mounted barbecue basket having a basket-shaped grill and a lid therefor such that the lid may be easily placed in its operable position and easily moved from such operable position.

Another specific object of the present invention is to provide an improved spit-mounted barbecue basket in which stampings are so formed and mounted on the basket portion so as to provide not only a support for the spit shaft but also to provide means whereby the lid portion may be conveniently held in adjusted position.

Spit-mounted barbecue baskets have heretofore been provided, such as that shown in the above mentioned patent in which the basket portion included separate elements for mounting the spit shaft and for maintaining the lid portion in adjusted position within the basket portion. In accordance with one feature of the present invention such separate means heretofore provided is incorporated essentially in a single element in the form of a stamping so as to facilitate construction, render such construction more inexpensive and to facilitate placement and removal of the lid portion from the basket portion.

It is therefore another specific object of the present invention to provide a construction having the advantages outlined in the preceding paragraph.

Another feature of the present construction is that a portion of the lid member itself is made resilient to secure the lid member in different adjusted positions within the basket portion.

It is therefore another specific object of the present invention to provide an improved lid member in a spit-mounted barbecue basket of this character.

Another specific object of the present invention is to provide improved construction of this character in which the handle portion of the lid member is made resilient to cooperate with spaced means on the basket portion for adjustment of the lid within the basket portion.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view of the basket portion of a spit-mounted barbecue basket embodying features of the present invention.

Figure 2 is a perspective view showing a portion of the lid member which forms the other element of a spit-mounted barbecue basket, and it is noted that the resilient handle portions of the lid member are shown in phantom lines in Figure 1 to illustrate the manner in which the lid of Figure 2 is secured in the basket portion of Figure 1.

Figure 3 is a view taken generally along the line 3—3 of Figure 1 with, however, the lid portion of Figure 2 in operative position within the basket portion shown in Figure 1.

Figures 4 and 5 are views taken generally along corresponding lines 4—4 and 5—5 in Figure 3.

The barbecue basket or spit basket includes the basket portion in the form of a generally rectangular open top grill 10 shown in Figure 1 and the lid portion in the form of an open wire grid 11 shown in Figure 2, and the assembly 10, 11 is mountable on a square cross-sectioned spit shaft 13 which is supported and rotated in conventional manner on a barbecue stand as illustrated in Figures 1 and 2 of the abovementioned Persinger patent, No. 2,839,989. For this purpose the spit shaft 13 has its end 13A fittable within a square motor-driven socket and the other end of the spit shaft 13 is machined to provide a rounded portion 13B whereby the same is rotatably supported on the barbecue stand.

Referring now to the specific construction of the basket or grill portion illustrated in Figure 1, it is noted that there are provided twenty-three equally spaced U-shaped rod elements 14 and that the vertical portions of each of the U-shaped rods 14 are secured as, for example, by welding to U-shaped rods 15, 16, 17, 18 which are of larger diameter than the diameter of rods 14. The rods 15 and 16 are vertically spaced on one side of the basket and the rods 17 and 18 are vertically spaced on the other side of the basket. The rods 15 and 16 each have one of their ends welded to the supporting bracket 20 and more specifically to the upwardly extending leg 20A of bracket 20; and the other ends of rods 15 and 16 are secured in like manner by welding to the leg 21A of bracket 21. In like manner one end of each of the rods 17 and 18 is welded to the leg 20B of bracket 20 and the other ends of such rods 17 and 18 are welded to the leg 21B of bracket 21. It is noted that these two brackets 20 and 21 are identical in construction and, indeed, are interchangeable in manufacture of the barbecue spit basket. It will be observed also that each of the brackets 20 and 21 also have an integrally formed horizontal portion 20C and 21C, respectively, in which is threadedly mounted thumb screws 23 and 24 for releasably engaging opposite end portions of the spit shaft 13 which passes through aligned square apertured portions 20D and 21D, respectively, in the brackets 20 and 21. These apertured portions 20D and 21D are generally square and somewhat larger than the spit shaft 13 and together with thumb screws 23 and 24 serve as a means whereby the basket portion 10 is releasably secured on the spit shaft 13.

It will also be observed in Figure 1 that the endmost rods 14A, 14B, 14C and 14D are each L-shaped with the vertical portions thereof secured as, for example, by welding to the horizontal rods 15 and 16, the rod portions 14A, 14C being welded to the rods 15 and 16 and in like manner the L-shaped rods 14B, 14D are welded to the rods 17 and 18. The other or horizontally extending portions of rods 14A and 14B are welded to the horizontal plate portion 20C of bracket 20; and likewise, corresponding parts of the rods 14C and 14D are welded to the plate portion 21C of bracket 21. It is noted that the two L-shaped rod portions 14A and 14B may be considered to be a single U-shaped rod, like one of the rods 14. The same is true of the rods 14C and 14D. By welding the rod portions 14A and 14B to the bracket 20 and by welding the rod portions 14C and 14D to the bracket 21, additional bracing is securing for the brackets 20 and 21.

Each of the leg portions 20A and 20B of the bracket 20 has a vertical series of spaced open-ended apertured portions 20E, 20F, respectively, in the form of hooks to serve as a spaced means whereby the lid element 11 (Figure 2) is maintained in any one of a plurality of adjusted positions as indicated by the phantom lines in Figure 1. For this purpose, also, the other bracket 21 has a vertical series of open-ended apertured portions 21E in the leg portion 21A and a vertical series of open-ended apertured portions 21F in the leg 21B.

The lid 11 shown in Figure 2 is generally an open planar grid element having twenty-five equally spaced rods 30 welded at or near their opposite ends to corresponding perpendicularly extending rods 31 and 32. Also welded to selected ones of such rods 30 are a pair of generally centrally disposed rods 34 and 35, each of which extends generally beyond the confines of the lid member and are bent as indicated at 34A and 35A and at 34B and 35B to form convenient resilient handles. It should be carefully observed that these rods 34 and 35 are welded only to selected ones of the cross rods 30. The cross rods 30 are twenty-five in number and such rods 34 and 35 are welded only to the eleven centermost ones of the rods 30. In other words, these rods 34 and 35 are not welded to the first seven cross rods 30 on each end of the lid member 11. This is for the purpose of allowing the ends of rods 34 and 35 to be resilient and movable towards each other by an operator squeezing the handle portions 34A and 35A together; and similarly by squeezing the handle portions 34B and 35B together. These rods 34 and 35 thus comprise resilient means which are engageable with selected ones of the open-ended apertured portions or spaced means 20E, 20F, 21E and 21F for purposes of maintaining the lid member 11 in adjusted position within the basket portion 10.

In operation, foodstuffs which are to be barbecued, such as cut-up chicken, hamburgers, steaks and the like, are placed in the basket portion 10. The operator then proceeds to place the lid member and in doing so he uses one hand to squeeze the handle portions 34A, 35A together and the other hand to squeeze the handle portions 34B and 35B together while at the same time moving the rods 34 and 35 down through the spacing between the end legs and center leg of the brackets 20 and 21. He proceeds to move the lid downwardly within the basket portion until the foodstuffs in the basket are firmly clamped between the lid and basket portion, after which he releases the handle portions 34A, 35A and 34B, 35B to thereby allow the resilient ends of rods 34 and 35 to enter adjacent open-ended apertured portions or hooks 20E, 20F and 21E, 21F. The assembly is then mounted on a barbecue stand with the spit shaft end 13A engaging a motor-driven cooperating square socket and with the round portion 13B rotatably supported in an apertured portion on the barbecue stand.

After the cooking operation, the assembly is removed from the barbecue stand and the lid 11 removed by pressing the handle portions 34A, 35A and likewise the handle portions 34B, 35B together and drawing the lid upwardly and outwardly from the basket portion. This latter operation is indicated in Figure 4 which illustrates the manner in which the resilient ends of rods 34 and 35 are moved together (as illustrated by the phantom lines) to disengage the rods 34 and 35 from the hook elements on the basket portion to allow the lid to be removed from the basket portion. Replacement and removal of the lid portion 11 is facilitated to some extent by engagement of the resilient rod ends 34 and 35 with the side edges of the center leg portions 20G and 21G of corresponding brackets 20 and 21.

Observing each one of the brackets 20 and 21 in more detail, it is noted that a portion of each of the brackets 20 and 21 is generally E-shaped with horizontal portions of the E being defined by, for example, outer legs 20A and 20B and the intermediate horizontal portion of the E being formed by the center leg 20G. Open-ended apertured portions are in each one of the outer legs of the E and face each other. Each one of these open-ended apertured portions is constructed as shown in Figure 5 and it will be observed that they are formed with portions that extend downwardly in the direction of the bottom of the basket element and thereby provide hooks for assuring maintenance of the lid member in adjusted position during rotation of the barbecue spit basket.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:
1. A rotatable food container spit basket, comprising: a rectangular grill having a bottom and having opposed end walls and side walls, each of said walls being formed of rod material and extending upwardly from said bottom to define a receptacle for receiving food, said end walls each comprising a pair of horizontally spaced portions; a plate member substantially coplanar with and forming the central portion of each of the opposed end walls between said spaced end wall portions, each plate member having vertical slots therein which are open at their upper ends, each plate member also having two series of generally horizontal slots with the slots of each series respectively intersecting one of said vertical slots in the same plate member from opposite directions; an upper grid member positioned horizontally between said opposed end and side walls and serving as the top of said receptacle; resilient rods mounted on the upper grid and extending outwardly beyond opposed end edges thereof and projectable through said vertical slots for selective entry into resilient engagement with the respective plate members in selected horizontal slots, said horizontal slots having their upper edges inclined downwardly toward said vertical slots, said resilient rods being resiliently moveable into and out of position in different ones of said horizontal slots for removably mounting said grid at selectable vertically spaced positions within said receptacle; and means on said receptacle for mounting the same on a rotatable spit.

2. The device of claim 1, wherein said resilient rods of said grid member are secured to the remainder of said grid member only at points in the central portion thereof spaced inwardly from the ends of said grid member.

3. The device of claim 1, wherein said means for mounting said receptacle comprise aligned openings in each plate member on said end walls.

4. A rotatable food container spit basket, comprising: a rectangular grill having a planar bottom and having opposed parallel end walls and parallel side walls, each of said walls being formed of rod material and extending perpendicularly upwardly from said bottom to define a receptacle for receiving food, said end walls each comprising a pair of horizontally spaced portions; a pair of plate members, one of said plate members being on one of said end walls and being substantially coplanar therewith and forming the central portion of said one end wall between the spaced end wall portions thereof, the other one of said plate members being on the other one of said end walls and being substantially coplanar therewith and forming the central portion of said other end wall between the spaced end wall portions thereof; each of said pair of plate members having a pair of vertically extending open-ended slots formed therein which extend upwardly with respect to said planar bottom with the open ends of said slots terminating at the upper edge of the respective plate members, each of said pair of plate members having two series of vertically spaced open-ended horizontal slots formed therein which extend generally horizontally with the inner ends of one of said series intersecting one of said vertical slots therein and the inner ends of said other series of horizontal slots terminating at the other of said vertical slots therein, said horizontal slots having their upper edges inclined downwardly toward said vertical slots; an upper grid positioned within said side and end walls and serving as the top for said receptacle; a pair of generally parallel resilient rods mounted on said upper grid and each having resilient end portions at the opposite ends thereof extending beyond the end edges of said grid, said end portions being received respectively through said vertical slots and being positioned in corresponding ones of the intersecting series of horizontal slots for resilient engagement with said plate members to mount said grid removeably at a selected level above said bottom.

References Cited in the file of this patent

UNITED STATES PATENTS

| | | |
|---|---|---|
| 890,219 | Cook | June 19, 1908 |
| 1,006,254 | Miller | Oct. 17, 1911 |
| 2,058,172 | Myers | Oct. 20, 1936 |
| 2,297,825 | Bobo | Oct. 6, 1942 |
| 2,340,595 | Jones | Feb. 1, 1944 |
| 2,839,989 | Persinger | June 24, 1958 |

FOREIGN PATENTS

| | | |
|---|---|---|
| 210,340 | Great Britain | Jan. 30, 1921 |